(No Model.)
J. J. FAULKNER.
COTTON SEED DELINTER.
No. 557,790. Patented Apr. 7, 1896.
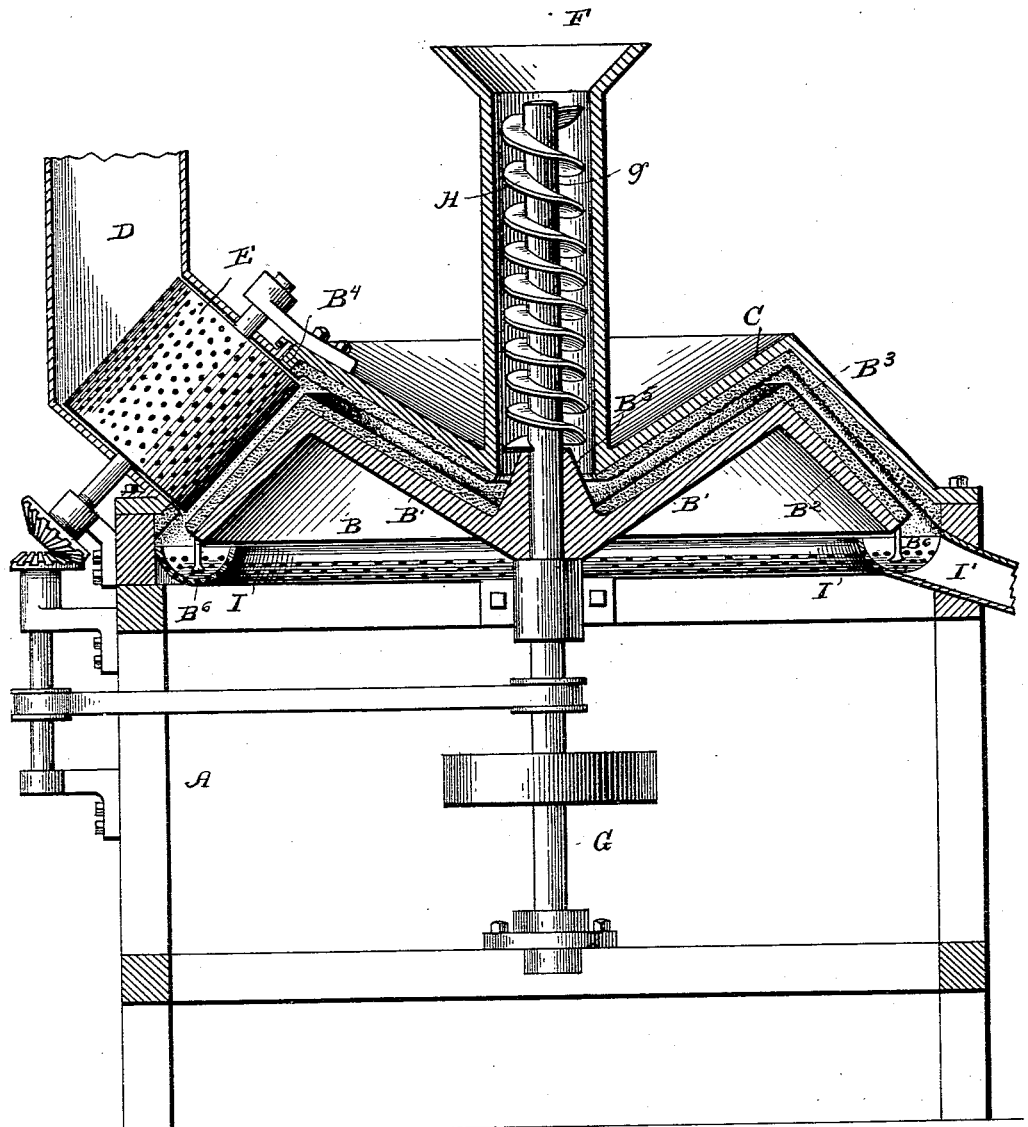
Witnesses
Victor J. Evans.
Marie Wilson
Inventor
James J. Faulkner.
by E. M. Marble & Sons,
Attorneys

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 557,790, dated April 7, 1896.

Application filed June 27, 1895. Serial No. 554,217. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter described, and particularly pointed out in the claims.

The machine which forms the subject of my present invention is of the so-called "centrifugal" type—i. e., that in which opposing disks form the abrading-surfaces and in which the seed, fed to such abrading-surfaces through a central opening formed in one of the disks, is carried by the force of centrifugal action between the disk-surfaces and discharged at the periphery of the same.

The object of my invention is to provide an improved receptacle for receiving the seed which has been subjected to the delinting action and for conveying the same to a common outlet-opening, and to use in connection therewith a form of abrading-surface peculiarly adapted to secure efficient abrading action.

In accomplishing the object of my invention I form the rotating-disk abrading-surface with an abrupt elevation between the center and the periphery of the same and conform the shape of the casing which I provide for such rotating disk with the shape of the same, so that the seed, which is fed into the machine through a central opening formed in the casing, is forced by centrifugal action first over the abrading-surfaces to the meeting of the inclined portions thereof and then to the periphery of the rotating disk, where it is discharged into a circular trough held in position below the circumferential opening between the abrading-surfaces. The seed, which is thus discharged around the entire periphery of the revolving abrading-surfaces, falling into the trough mentioned, is fed forward toward a discharge-outlet in the same by conveyer devices attached to the revolving abrading-disk, the dirt escaping from the seed through perforations formed in the trough. I effect the removal of the lint, which is separated from the seed by the action of the machine, by forming an opening in one side of the casing and placing in connection therewith the open mouth of an air-flume. In this air-flume I station so that its periphery comes in close contact with the abrading-surfaces a cylinder having perforations formed therein, so that the lint which is separated from the seed is stripped upon the surface of this cylinder by the air-current and drawn into the air-flume. It is then carried through the air-flume by the force of the exhaust air-current to a suitable outlet.

My invention is fully illustrated in the drawing which accompanies and forms a part of this application, in which the same reference-letters refer to the same or corresponding parts, and in which is represented a central vertical section of my machine.

Referring to the drawing, A represents the machine-frame, in which is supported in suitable bearings the revolving abrading-disk B. This disk is formed with an upwardly-extending portion B' and a downwardly-extending portion B², the two portions of the disk meeting at an abrupt angle B³. The upper surface of the disk is covered with any suitable form of abrading substance, and in the drawing is shown as covered with a coating of emery, the surface of which is smooth. A casing C is provided for the abrading-disk, which conforms in shape with the contour of the disk. It is separated therefrom by a distance which in my preferred construction does not exceed five-eighths of an inch, though this distance may be varied, if desired. The inner surface of the casing is lined with an abrading composition, such as emery, and, as shown, is somewhat roughened. I do not limit myself, however, to these forms of abrading-surfaces, but may use any suitable construction for this purpose.

On one side of the casing, in the downwardly-inclined portion thereof, there is formed an aperture, with which the open end of the air-flume D is in communication. Within the air-flume is supported a rotating cylinder E, whose periphery is perforated and comes in close contact in its revolution with the abrading-surfaces. An upward air-current is caused to exist in the air-flume, owing to the action of which the lint, which is removed from the seed by the action of the machine, is stripped against the surface of the cylinder E and drawn by its revolution into the air-flume, through which it is conducted to a suitable point of discharge. The passage of the seed into the air-flume with the lint is prevented by the guard-plates B$^4$, one on either side of the opening within which the lint-removing cylinder operates. These guard-plates are formed with sharp edges and fit very closely against the sides of the cylinder E, so as to prevent the passage of seed into the same.

The seed is fed into the machine through the feed stand-pipe F, which communicates with the abrading-disk through the central opening in the top of the casing. An upwardly-extending portion $g$ of the central power-shaft G projects within the feed stand-pipe F. Upon the same is mounted a spiral conveyer H, which acts to feed the seed positively into the machine. The seed strikes in its downward passage the conical projection B$^5$ in the center of the revolving abrading-surface and is deflected outwardly, so as to be more readily subjected to the action of the abrading-disks. The seed is thrown outward by centrifugal motion toward the periphery of the rotating disk. The lint is scoured from the faces of the same by the action of the abrading-surfaces between which it passes, and is removed by the perforated cylinder E. The seed is finally discharged into the perforated trough I, which surrounds the outer edge of the rotating abrading-surface. On one side of this trough an outlet I' is formed, to which the seed, which falls into the circular trough I, is conveyed by the conveyer-pins B$^6$, which project downward from the edge of the revolving disk.

Dirt and other impurities are removed from the seed before it is discharged through the discharge-outlet by falling through perforations in the trough.

The operation of my machine is as follows: Seed which is fed into the machine through the feed stand-pipe F by the action of the conveyer H is thrown outward by centrifugal action as soon as it comes in contact with the abrading-surfaces and is subjected to the scouring or abrading action thereof during its passage to the peripheral discharge-opening formed between the rotating and stationary abrading-disk surfaces. As a result of the formation of the disk-surfaces with an elevation midway between the center and periphery thereof, as shown in the drawing, the seed is caused to travel over a longer distance to reach the discharge-opening than would be the case if a flat disk-surface were used. In this manner a more thorough scouring of the seed is caused than would otherwise be possible.

The lint, which is separated from the seed by the action of the machine, is carried upward into the air-flume D by the action of the lint-removing cylinder E, which operates through an aperture in the casing for the rotating abrading-disk. The seed, which is discharged into the circular trough I, which surrounds the outer edge of the abrading-disk, is conveyed toward the discharge-outlet I' of the same by the downwardly-extending conveyer-pins B$^6$. All impurities present with the seed escape from the same through the perforations in the circular trough before the seed is finally discharged.

Having thus fully described my invention, what I claim as new, and desire to secure by Letters Patent, is—

1. In a cotton-seed delinter, the combination with an abrading-disk and a casing therefor, said disk being formed with an annular elevation between the center and the periphery thereof, of a central seed-inlet opening, a peripheral discharge-opening, means for removing the lint separated by the action of the machine, a circular trough with an outlet therein suspended below the peripheral discharge-opening, and a conveyer device attached to the abrading-disk and operating in said trough, substantially as described.

2. In a cotton-seed delinter, the combination with a revolving abrading-surface, and a casing therefor, of a central feed-opening, a peripheral discharge-opening, a circular trough with an outlet therein suspended below the peripheral discharge-opening, and a conveyer device attached to the abrading-surface, and operating in said trough, substantially as described.

3. In a cotton-seed delinter, the combination with a revolving abrading-surface, and a casing therefor, of a central feed-opening, a peripheral discharge-opening, a circular trough with an outlet therein suspended below the peripheral discharge-opening, said trough having perforations formed therein, and conveyer-blades projecting from the periphery of the abrading-surface and operating in said trough, substantially as described.

In testimony whereof I affix my signature in presence of two witnesses.

JAMES J. FAULKNER.

Witnesses:
R. W. RAMSEY,
JOHN HALLUM.